April 15, 1924.

C. F. WOODWORTH

SLITTING MACHINE

Filed Dec. 13, 1920   7 Sheets-Sheet 1

1,490,549

Inventor.
Clarence F. Woodworth
By Daniel J. Brennan.
Attorney.

April 15, 1924.

C. F. WOODWORTH

SLITTING MACHINE

Filed Dec. 13, 1920

Inventor
Clarence F. Woodworth
by Daniel F. Brennan.
Attorney

April 15, 1924.

C. F. WOODWORTH

SLITTING MACHINE

Filed Dec. 13, 1920   7 Sheets-Sheet 5

1,490,549

Inventor
Clarence F. Woodworth
By Daniel J. Brennan
Attorney

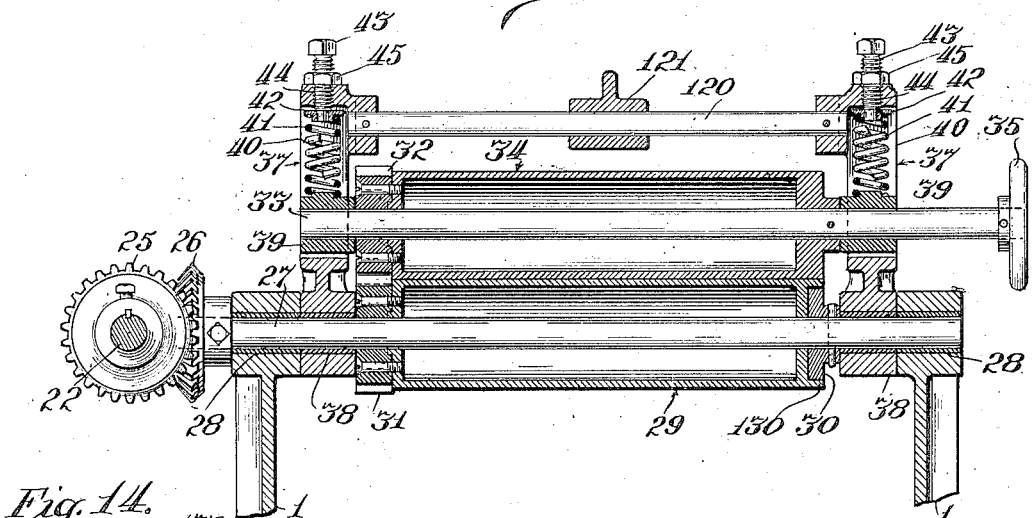
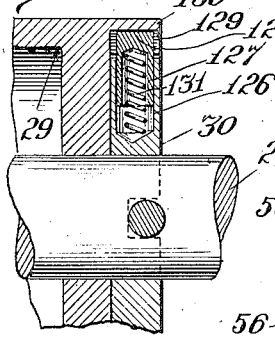
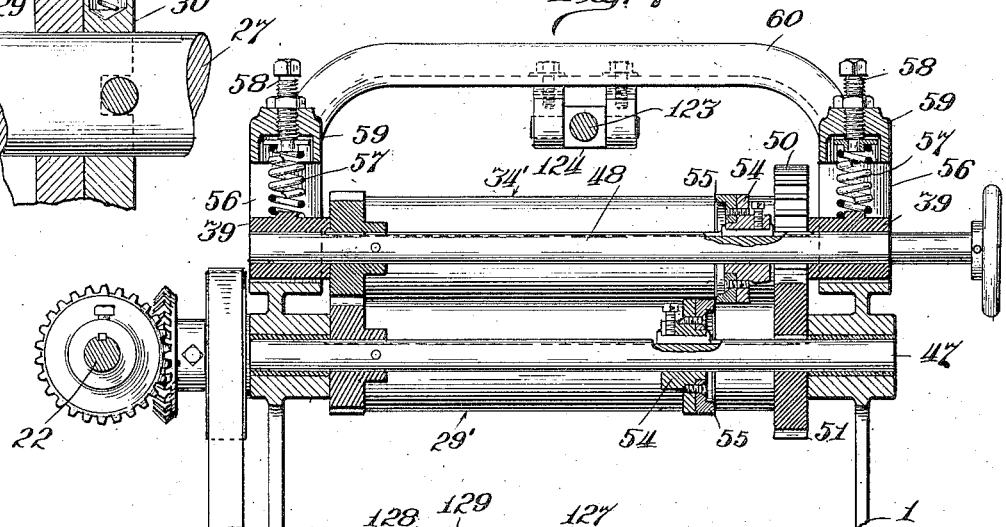

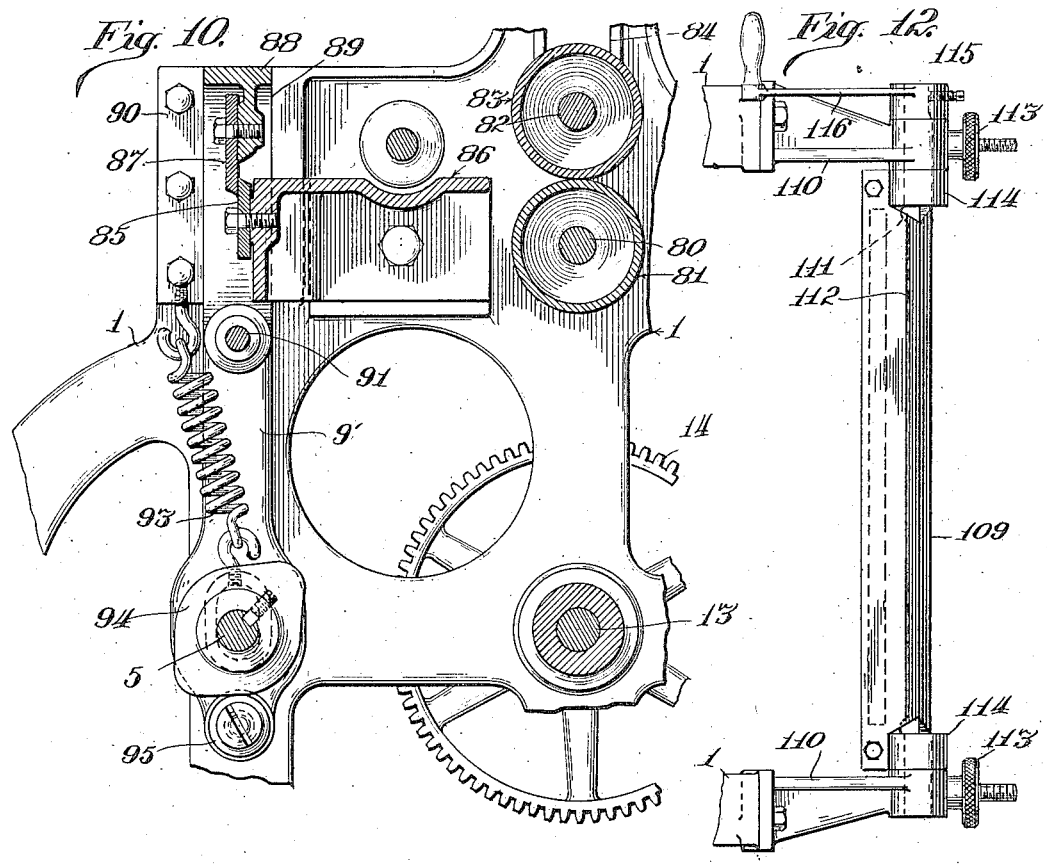
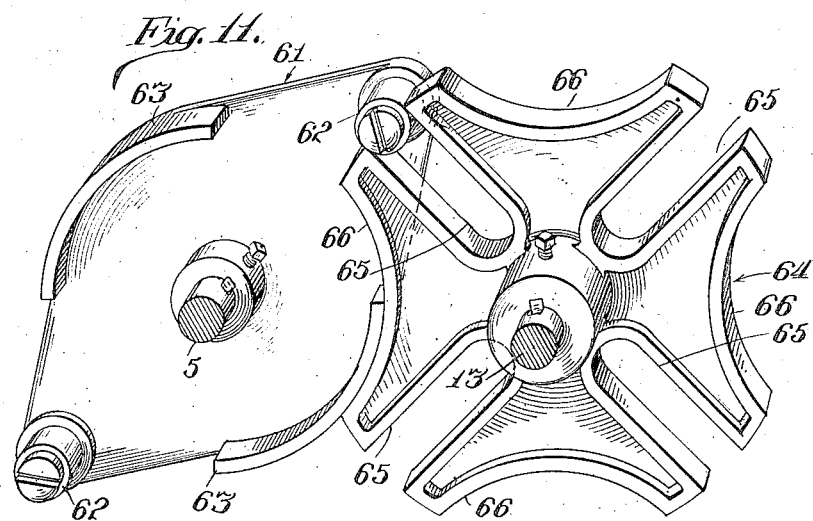

Patented Apr. 15, 1924.

1,490,549

UNITED STATES PATENT OFFICE.

CLARENCE F. WOODWORTH, OF CHICAGO, ILLINOIS.

SLITTING MACHINE.

Application filed December 13, 1920. Serial No. 430,376.

*To all whom it may concern:*

Be it known that I, CLARENCE F. WOODWORTH, a citizen of the United States, residing at Chicago, in the county of Cook and State of Illinois, have invented a new and useful Improvement in Slitting Machines, of which the following is a specification.

This invention relates to improvements in machines for treating sheet material.

It is an object of the invention to straighten out sheet material, particularly sheet copper, brass, aluminium, paper, cardboard or the like, by passing the material through a number of sets of rollers which act successively on the material so as to remove all wrinkles or other uneven portions from the material by flattening it and to facilitate subsequent operations on the same.

It is also an object of the invention to provide in combination with the straightening or flattening rollers of the machine means for trimming one edge of the sheet material while the material is continuously advanced through the machine.

The invention also has the object of combining with the straightening or trimming devices referred to, means for cutting the sheet material into units of predetermined adjustable length and to deliver these units successively from the machine.

It is, therefore, also an object of the invention to combine with a drive for continuously advancing the sheet material through the machine, means for intermittently advancing material to a shearing device, and to intermittently interrupt the feed of the material to the shearing elements without, however, interrupting the feed of the material to the draining elements.

It is also an object of the invention to provide means for continuously rewinding that edge strip which has been trimmed off from the material while the latter advances through the machine and to combine this rewinding device for the severed strip with elements facilitating the removal of the coil of this strip without interrupting the operation of the machine.

The invention also contemplates the provision of means for facilitating the introduction of the front edge of the material to be treated between the various rollers or other elements of the machine, and to facilitate, furthermore, the threading of this material through the machine without requiring the machine to be driven by that prime mover by which it is driven during normal operation.

With these and numerous other objects in view an embodiment of the invention is described in the following specification and illustrated in the accompanying drawing to which reference is made in the specification.

Figure 1:
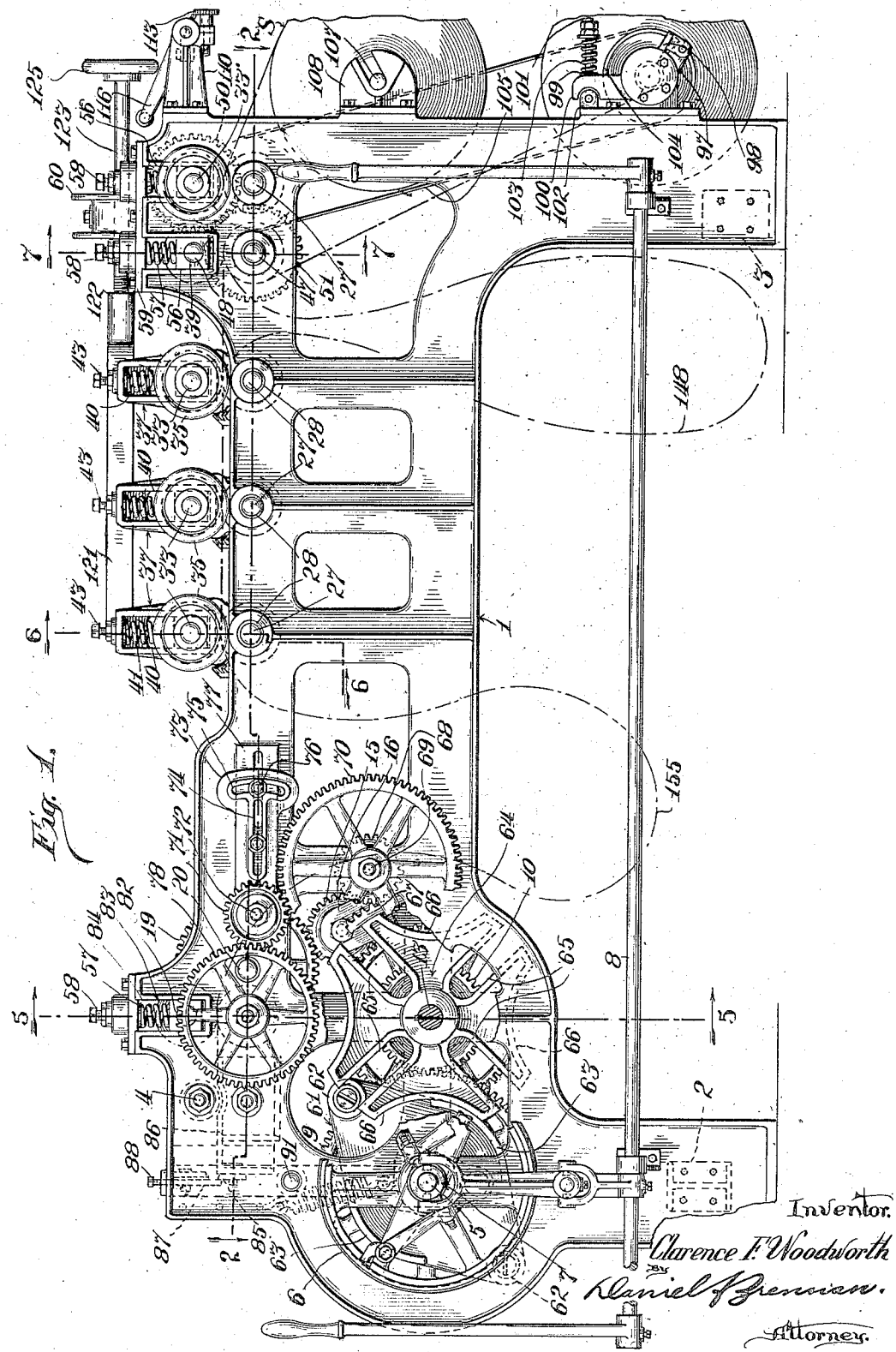
Fig. 1 is a side elevation of the machine.
Figure 2:
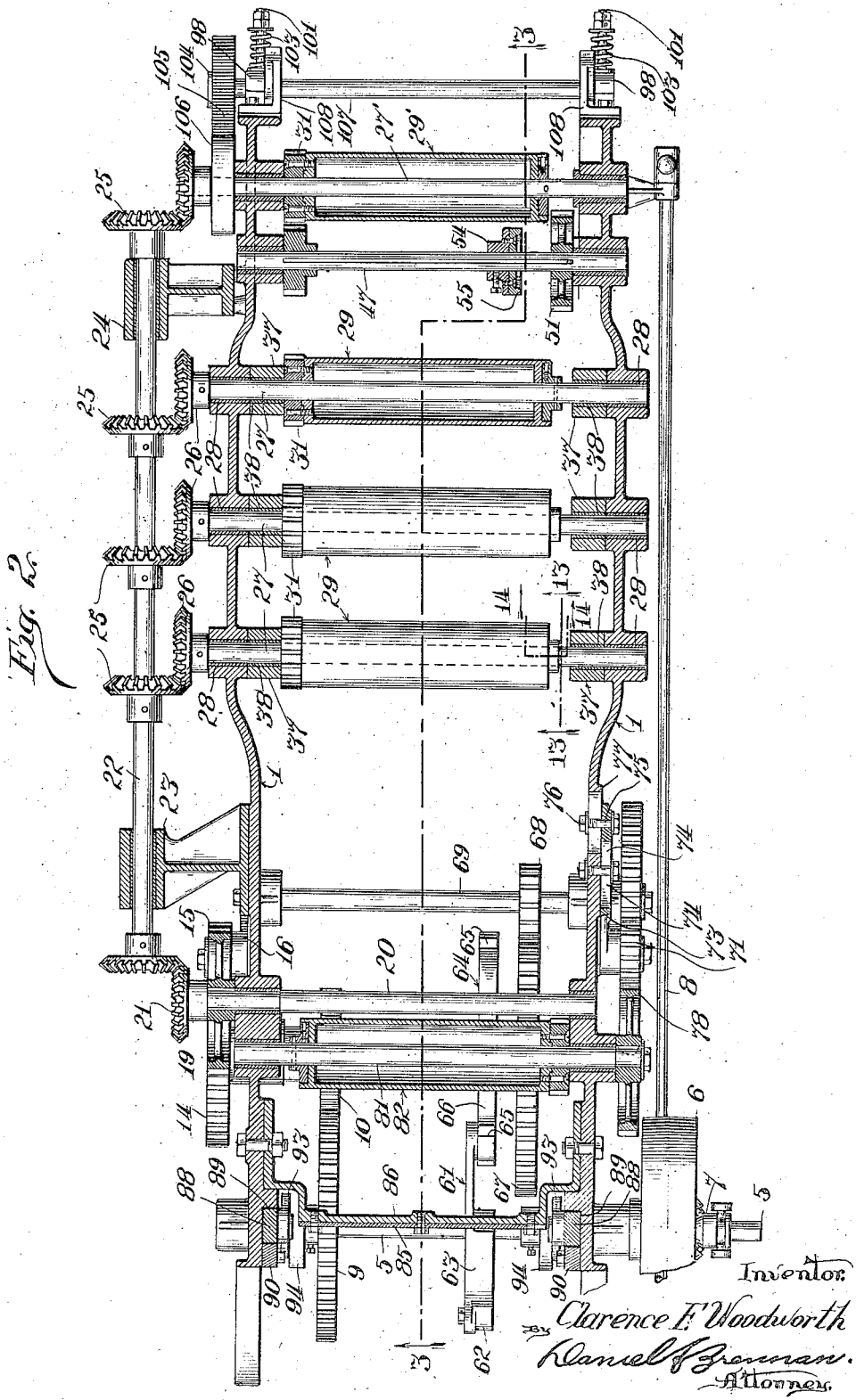
Fig. 2 is a sectional view on line 2—2 of Fig. 1.
Figure 5:
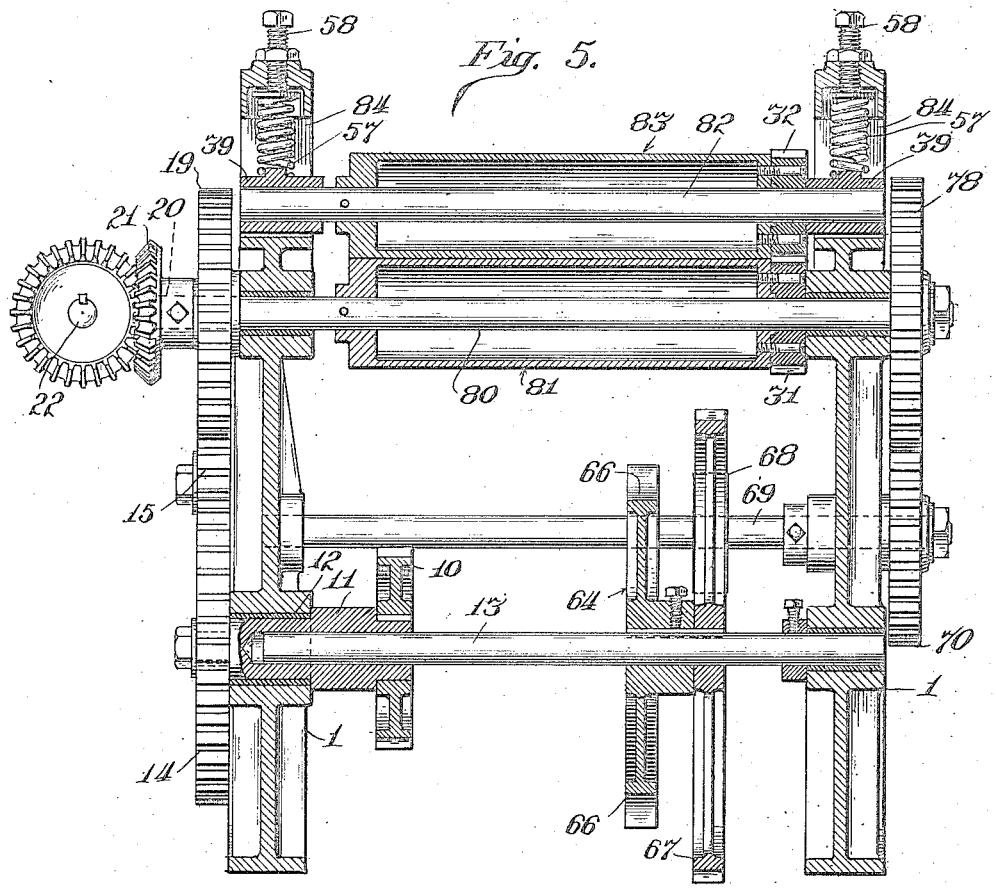
Figure 8:
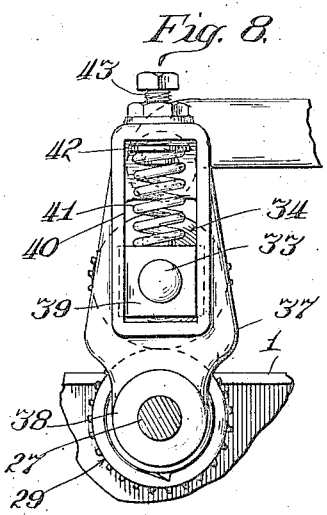
Figure 9:
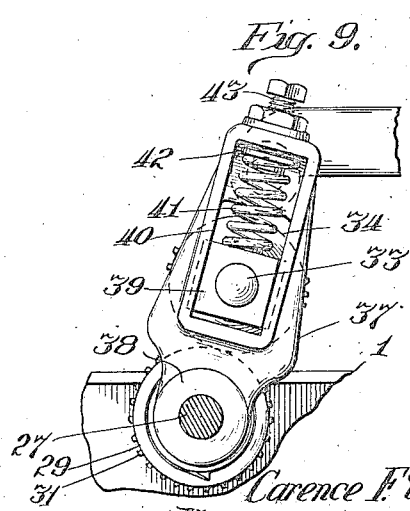

Figs. 5, 6, and 7 are transverse vertical sectional views on line 5—5, 6—6, and 7—7 of Fig. 1;

Fig. 8 is a detailed view of an oscillatable bearing in operative position;

Fig. 9 is a view of the same bearing in a modified position;

Fig. 10 is an enlarged sectional detailed view of the shear and shear-actuating elements;

Fig. 11 is a perspective view of the Geneva wheel mechanism for converting continuous motion of one shaft into interrupted rotation of another shaft;

Fig. 12 is a top plan view of the mechanism for connecting the end of one sheet of copper with the beginning of another sheet;

Fig. 13 is an enlarged sectional detailed view on line 13—13 of Fig. 2; and,

Fig. 14 is a similar sectional view on line 14—14 of Fig. 2.

The frame of the machine comprises side castings 1 which are united near their lower ends at the front and rear by transverse braces 2 and 3. The upper portions of these side castings may also be united by brackets for the shears and by tie rods, one of which is indicated at 4.

Figure 3:
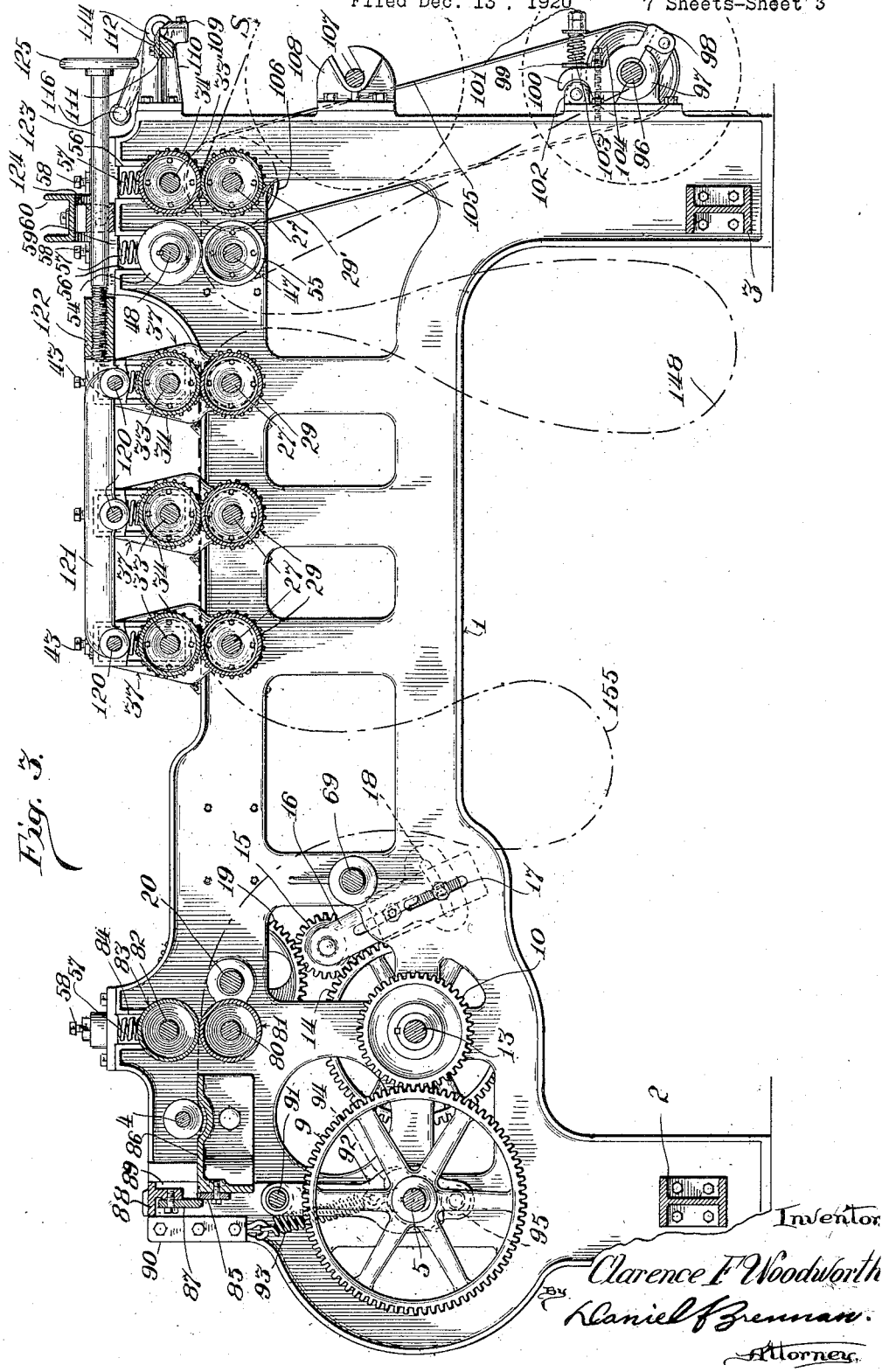
Fig. 3 is a longitudinal vertical section on line 3—3 of Fig. 2.

The main shaft 5 of the machine which, as shown in Figs. 1 and 3, is located near the left hand or rear end of the frame carries at that portion which projects from the side plate a loose pulley 6. The connection between this loose pulley and the shaft 5 may be established by a Johnson friction clutch indicated as a whole at 7 or by some other coupling device which is under the control of hand levers, one of each of these levers being located at the front and at the rear end of the machine and the two levers being united by a rock shaft 8 extending along the frame of the machine and supported in suitable brackets on the outer side of the pertaining plate. The coupling 7, therefore, may be thrown into operative position or into inoperative position from either end of the machine, thereby facilitating the work of the attendant.

A gear 9 mounted on the main shaft 5 of the machine between the two side castings 1 is in driving engagement with another gear 10, Fig. 5, which is keyed to a sleeve 11, finding its support in a bushing 12 in the left hand side plate 1. The sleeve 11 loosely supports one end of a shaft 13, the other end of which is journaled in a bearing of the other side plate 1. Near the outer surface of the side plate through which the bushing extends the sleeve 11 is rigidly connected with a gear 14 in driving relation with an intermediary gear 15. This intermediary gear is mounted at the end of an adjustable support, shown in Fig. 3 in the form of a bracket 16, which is slidable in its longitudinal direction owing to the provision of a slot 17 in the side plate and through which a bolt extends. The bracket also is adjustable transversely thereto, owing to the provision of the slot 18 in the bracket itself. The interposition of this intermediary gear 15 removably mounted on the adjustable bracket 16 renders it possible to modify the ratio of transmission between the gear 14 and the gear 19 which is mounted on a shaft 20 projecting from the left hand side plate of the machine, this shaft being extended beyond the gear 19 and carrying at the projecting end a mitre gear 21. The countershaft 22 which extends parallel to the axis of the machine and which is supported in brackets 23 and 24, Fig. 2, serves for driving the various sets of rollers described below:

A typical set of these rollers is illustrated in Fig. 6. The countershaft 22 which extends parallel to the axis of the machine is provided in opposition to each of these sets of rollers with a bevel gear 25 in driving engagement with the similar bevel gear 26 which is rigidly mounted on the shaft 27, extending transversely through the machine and supported in bearings 28 near the top of the side plates 1. The shaft 27 which serves for supporting the lower roller 29 is in driving connection with said roller 29 through a disk 30 pinned to the shaft 27, the details of the driving clutch being described below. The other end of the roller 29 is fixedly connected by countersunk flat-head screws with a pinion 31 in driving relation with a similar pinion 32 which is loosely mounted on the upper shaft 33. A companion roller 34 is connected with the pinion 32 in a manner similar to that in which the roller 29 is secured to the pinion 31, and the other end of the roller 34 is fixedly pinned to the shaft 33. This shaft, as will be seen from Fig. 6, projects beyond the side plate 1 and carries a hand wheel 35 whereby the upper roller 34 may be rotated independently of the drive of the machine, and this manual rotation is then transmitted through the pinion 32 and pinion 31 to the lower rollers 29 of the set. It will, therefore, be seen that a manual drive is provided in addition to the automatic mechanical drive of the machine, and that the line of transmission of the manual drive is opposite to the direction of transmission of the mechanical drive.

While the shaft 27 of the roller 29 is supported in the bearings 28 of the side frame and, therefore is immovable longitudinally of said frame, the upper shaft 33 is mounted at both of its ends in a bearing structure which is movable relatively to side plates 1. The details of this bearing structure are more clearly shown in Figs. 8 and 9.

A bracket 37 carries at its lower end a bearing 38 through which the shaft 27 extends, this shaft being bushed in said bearing in the ordinary way. Owing to this arrangement, the bracket 37, therefore, is supported oscillatably upon the shaft 27 of the roller seat. The bracket 37 also serves for receiving the bearing 39 of the upper roller shaft 33, this bearing 39 being shown in Figs. 8 and 9 as consisting of a block which is guided in a rectilinear path in a rectangular opening 40 of the bracket 37. The proper distance between the two rollers may be maintained by adjustment of the upper bearing 39 relatively to the bracket and for this purpose the bracket 37 receives in the rectangular opening a spring 41 seated at its lower end against the upper surface of the block 39 which for this purpose is provided with a lug and pressing at the upper end against a plate 42, at the lower end of a screw 43 which is in threaded engagement with a tapped opening 44 of the bracket and which is held in suitable adjusted position by a lock nut 45.

The bearing 37 with the roller 34 supported thereby may be swung about the axis of the companion roller 29 and is, therefore, movable relatively to the frame of the machine longitudinally thereof, while at the same time the pressure with which the two rollers 34 and 29 are forced against each other or against the sheet of metal which is passed through the machine may be adjusted.

A mitre gear 25 near the forward end of the countershaft 22 serves for imparting the drive to that set of rollers which conducts the sheet metal from a storage spool or coil into the machine. The construction of these rollers 29' and 34', as indicated in Figs. 2 and 3, may be approximately the same as the construction of the rollers 29 and 34, illustrated in Fig. 6. This set of rollers, however, also serves for driving rotary coacting cutters through which one edge of the strip of metal drawn through the machine is severed, thereby defining exactly the width of the strip of metal passed through the machine.

The shaft 27' for roller 29' drives through gears 31—32 the upper roller, whose shaft 33' has at the opposite end a gear 50 in mesh with a gear 51 on the lower shaft 47 of the adjacent pair of shafts. The shaft 48 receives its drive from the shaft 47 through gears 31—32, as described with respect to the other shafts.

The cutters on the shafts 47 and 48 are adjustable longitudinally on these shafts, but rotate with the same, these cutters comprising the hub members 54 and the cutting members proper, 55, which are secured to the hub members in some suitable way.

The upper shafts 48 and 33' of the rollers near the front end of the machine are also supported in bearings which are adjustable, with respect to the other shafts of the same set. These adjustable bearings are formed by blocks 39 slidably arranged in guideways 56 of the frame and controlled by springs 57, the tension of which may be adjusted by the screws 58. The upper ends of the guideways 56 are closed by the base plate 59 of a yoke 60 which bridges the frame near the front end and at the same time serves as a tie for the two side plates 1.

For the purpose of severing the continuous strip into units of predetermined adjustable length, a shearing device is disposed at the rear end of the machine, this device being actuated intermittently and being in close proximity to a set of rollers which is also driven intermittently so as to feed the strip intermittently to the shear blades. During the shearing operation, the feeding rollers for the shears are maintained at rest, while during the rest period of the shears the feeding rollers are actuated to advance the strip through the space between the knives.

The actuating means for the intermittent rotation of the feed rollers comprise an oval cam 61 which is mounted on shaft 5 of the machine and rigidly connected therewith. This cam has the anti-friction rollers 62 projecting from the plane of the cam plate, and it also has arcuate flanges 63 projecting near the edge of the plate from its plane. The countershaft 13 on which the gear 10 is loosely mounted (Fig. 5) has rigidly connected therewith a Geneva wheel 64 with four radial gaps 65 and arcuate edge portions 66 intermediate said gaps. It is obvious, therefore, that the continuous rotation of the shaft 5 will be transmitted intermittently to the shaft 13 and that during intervals, owing to the provision of the flanges 63 in contact with the arcuate portions 66, the shaft 13 will be positively held against rotation.

A gear 67 (Fig. 5) keyed on shaft 13 is in mesh with a smaller gear 68 on a transverse shaft 69 supported in suitable bearings in the machine. The shaft 69 carries at the end projecting from the right hand side plate 1 a gear 70 (Fig. 1) which is in engagement with another gear 71 supported on a stub shaft 72 which is secured to a bracket 73. This bracket is adjustable to permit an exchange of the gear 71 and for this purpose is provided with a longitudinal slot 74 and an arcuate slot 75, the latter intersecting a longitudinal slot in the side plate. Holding screws 76 extend through these slots and through a machined lug 77 on the side plate 1. The intermediary gear 71 drives a gear 78 (Fig. 5) on the outer end of a shaft 80, on which a roller 81 is fixedly secured and the rotation of this shaft 80 is transmitted by pinions 31 and 32 to an upper shaft 82 on which another roller 83 also is fixedly mounted. The shaft 82 has its ends supported in slidable bearings 39 which are movable in guideways 84 it is under the control of a spring 57 the tension of which may be adjusted through the screw 58 similar to the adjustment described above, with respect to the bearings at the other end of the machine.

Owing to the provision of the slidable bracket 73 on which the intermediary gear 71 is mounted, it is obvious that the speed at which the set of rollers 81, 83 is driven may be altered as desired.

Figure 4:
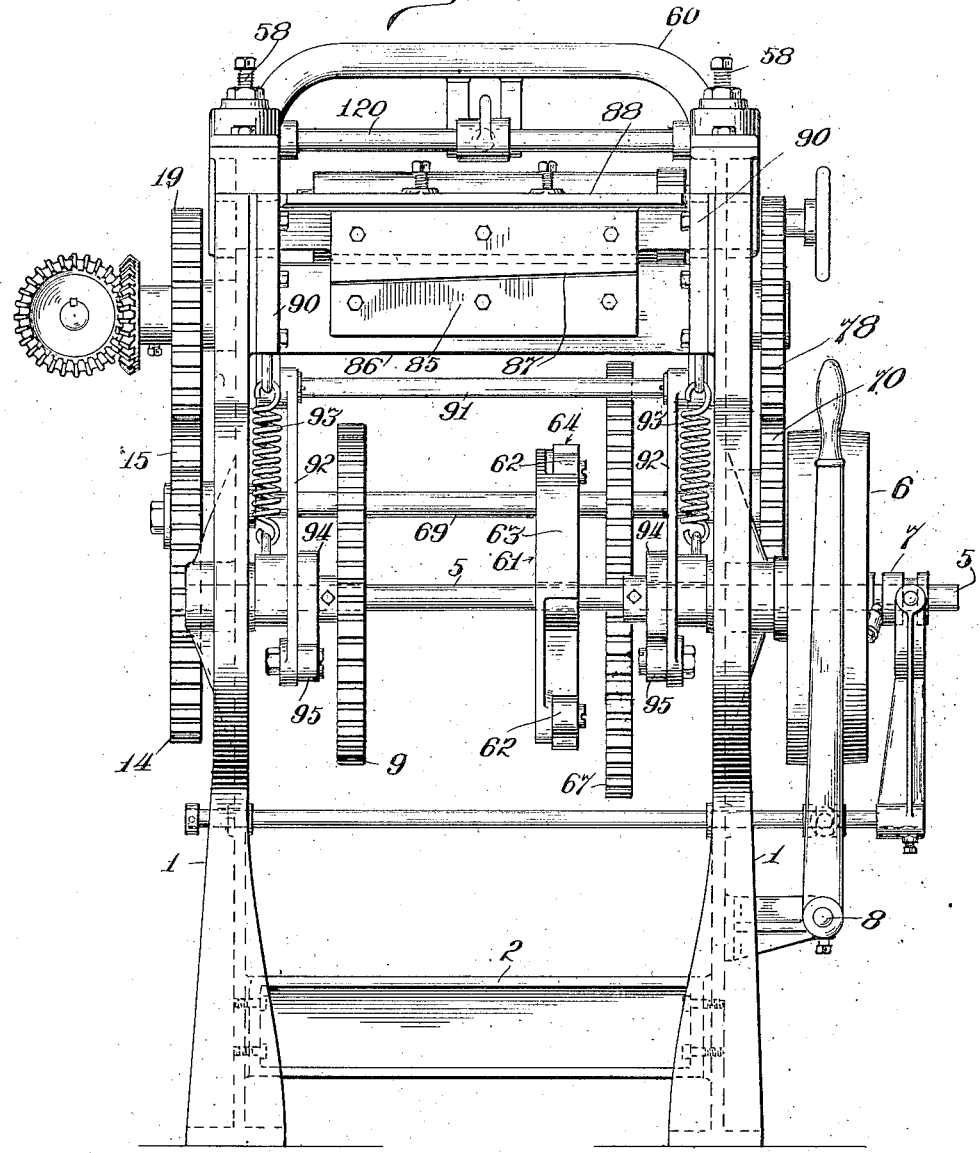
Fig. 4 is an end elevation.

The drive of the shears is apparent from Figs. 3, 4, and 10 of the drawings. The lower or rigid shear blade 85 is removably secured to the front surface of a bracket 86, comprising lateral walls which are secured to the side plates 1, a front wall and a top. The movable shear blade 87 is secured to a bracket 88 which is guided in ways 89 (Fig. 2) in the side walls 1 of the machine, each of these guideways 89 being formed partly by a removable bar 90. The lower end of the bracket 88 carries a transverse bar 91 to which links 92 are secured. The lower ends of the link have hub extensions being provided with an elongated bore instead of a cylindrical bore of the ordinary hub. Spring 93 connected at the lower end with the hub extension and at the upper end anchored to rigid parts of the machine frame have a tendency to maintain links 92 and thereby the bracket 88 with the upper shear blade 87 in raised position, and to return the elements to raised position if they should have been lowered.

For the purpose of lowering these parts to effect the shearing movement of the upper blade 87, cams 94 approximately diamond shaped are secured to the main shaft 5 of the machine, while the links 92 are equipped each with an anti-friction roller 95 which is held permanently in contact with the pertaining cam 94, owing to the spring 93. During the rotation of the shaft 5 the cam 94 will alternately force this roller 95 downwardly, thereby also moving the link 92 and the bracket with the shear blade 87 against the tension of the spring 93 in downward direction to effect a cut. In the intervals between these depressions of the roller 95 the spring 93 raises these parts and also maintains the roller permanently in operative engagement with the cam.

From Fig. 4 it will also be noted that the cutting edges of the blades 85, 87 are located at an angle to the horizontal so as to bring the shearing force gradually into action against the metal instead of effecting the cut in a single punch-like operation over the entire width of the material.

The cam 94 and the cam plate 61, both of which are mounted on the driving shaft 5 of the machine, of course, must be offset angularly relatively to each other to produce a shearing cut, while the rollers 83 and 81 are held against movement, and to hold the shearing blade 87 inoperative in that period of the operation in which the rollers 62 of the cam 61 impart a rotary step to the star wheel 66.

Means are provided for winding up the strip, severed by the cutters 55 from the sheet metal, these means being located near the front end of the machine. A shaft 96 is supported in a bearing 97 which is secured to a bracket near the front end of the side plates 1. An extension of the bearing part 97 carries pivotally mounted thereon a supplementary bearing cap 98 which may be held in the operative position shown in Fig. 3 of the drawing by a washer or plate 99 pressing against a nose 100 of the cap 98. The washer 99 is mounted on a bolt 101 which is pivoted upon the lug 102 of the bracket. A spring 103 has a tendency to force the plate 99 to the operative position shown in Fig. 3 thereby also effectively holding the bolt against same when such movement is not intended. The shaft 96, as shown in Figs. 1 and 2, carries a pulley 104 which is driven by a belt 105 from a suitable pulley 106 rigidly mounted on the shaft 27' of the roller 29' through which the material is introduced into the machine.

The sheet material preferably is supported in the form of a spool S on a rod 107 which is carried in a slanting notch of a bracket 108, also mounted on the front end of the machine, as shown in Figs. 1 and 3. It is obvious that in this way the removal of a spool and the introduction of another spool is greatly facilitated.

In order to connect the rear edge of a strip just passing through the machine with the front edge of another strip to be inserted into the machine, a crimping device is located near the front wall and near the top of the machine. A stationary crimping plate 109 is adjustably secured between bearing brackets 110, which are fastened to the front edges of the side plates 1. Between these bearing brackets is also located a bar 111 on which another crimping plate 112 is adjustably secured. The adjustment of the plate 109 may be effected by the thumb screws 113, shown in Fig. 12, and the bar 111 is secured to collars 114 which are firmly connected with the hub 115 of a handle 116. Through suitable swinging movement of the handle 116, the crimping bar 112 may be turned so as to fold adjacent edge portions of superimposed strips about the edge of the bar 109 and to flatten them against each other whereby the two strips may be drawn through the machine, without interruption of operation.

For the purpose of facilitating the introduction of the edge of the strip between the rollers 29 and 34, the upper rollers, as stated above, are supported in bearings which are oscillatably supported, with respect to the shafts 27 of the lower rollers as indicated in Figs. 8 and 9. The two bearing brackets 37 pertaining to the same roller 34 are interconnected by a transverse bar 120 and the transverse bars of these three rollers are interconnected in their central portions by a longitudinal bar 121 (Fig. 1), terminating in a tapped socket 122. A spindle 123 enters this socket 122 and is rotatably guided in a bearing 124 which is pivotally suspended from the yoke 60 spanning the two side plates near the front end of the machine. It is obvious, therefore, that upon axial displacement of the spindle 123 which carries at the front end a hand wheel 125 the longitudinal bar 121 also may be displaced in longitudinal direction, thereby causing a swinging movement of the upper brackets 37 and rollers 34 about the axis of the lower rollers and if the edge of a strip of metal has been inserted between these rollers when they are in the position in Fig. 9, through the return movement to the position in Fig. 8, this edge will be firmly gripped and slightly pushed through the space between the rollers.

It is also necessary to facilitate the threading movement of the strip of sheet metal through the machine prior to the starting of the machine, without necessitating the drive through a motor or the like, not shown in the drawing. This threading movement, which necessitates the rotation of the various cooperating rollers successively and independently of each other is effected by means of the hand wheels 35 which are mounted at the end of the shafts 33, and one of which is also mounted on the shaft on which the first roller 34' is rigidly secured. The rollers 34 are fixedly connected with their pertaining shafts 33. The manual rotation of the rollers 34 is transmitted through the gears 31, 32 to shafts 27 or 27'. Rollers 29, 29', however, are not keyed or pinned to their shafts 27 and 27' so that rotation is not transmitted to the shafts 27. A disk 30 which is rigidly keyed or pinned to the shafts 27 is provided with a radial socket 126 in which a sleeve 127 is slidably mounted. The outer end of this sleeve is formed into a tooth 128 adapted to engage a suitably shaped notch 129 in a flange 130 of the pertaining roller 29. The slidable sleeve 127 is forced outwardly, to enter said notch, by a spring 131 which is seated in the socket, and a key 132 also located in the socket and entering the keyway of the sleeve 127 prevents dislocation of the tooth 128, with respect to the notch 129.

If, therefore, by manually rotating the shaft 33, power is transmitted from the respective roller 34 to the companion roller 29, the latter will be rotated owing to the gears 32 and 31, without simultaneously causing the rotation of the disk 30 and of the shaft 27 to which said disk is pinned. If, however, the direction of the transmission of power is reversed, the roller 29 will be rotated owing to the engagement of the tooth 128 against the radial side of the notch 129 and this rotation is transmitted through the gears 31 and 32 to the roller 34. When the roller 29 is rotated manually in a predetermined direction the inclined side of the notch 129 will slide over the tooth 128, forcing the tooth inwardly against the tension of the spring 131, and the rotation will, therefore, not be transmitted to the disk 30.

The operation of the machine will probably be clearly understood from the above. A spool S of the material to be treated is placed into the bracket 108 on which it rests by means of the rod 107. The front edge of this material is then introduced between the rollers 34' and 29' near the front end of the machine, these parts being easily accessible to the workingmen at the front end. By manually rotating the shaft on which the roller 34' is mounted, in a certain direction the lower roller 29' also will be rotated, whereby the strip of metal is advanced to the coacting rotary cutters 55 on the shafts 47 and 48. These cutters have previously been adjusted longitudinally of their shafts so as to be in coaction with each other and so as to cut one strip of the edge portion of the material, while the latter is passed through the machine. The manual rotation of the roller 34' is then continued until a sufficiently long strip of material has passed between these rollers to form between the cutter 55 and the adjacent set of rollers a relatively deep loop, indicated at 148, and at the same time the edge portion of the strip cut by the rollers is wound upon the shaft 96 which is driven through the pulley 106 at the end of the shaft 27'.

In order to fasten the edge of the sheet material between the rollers 29 and 34, the spindle 123 is then longitudinally displaced to tilt all of the brackets 37 from the position indicated in Figs. 3 or 8 to the position indicated in Fig. 9. The various upper rollers of these sets are then rotated manually so as to permit the material to be passed successively through the spaces between these rollers, then forming another loop 155 between the last set of these coacting rollers and the rollers 81 and 83, which serve for feeding the material to the shears. The edge of the material also is passed through the space between these rollers and the machine may then be started whereby, owing to the continued drive of the feeding rollers 29 and 34 and the intermittent drive of the rollers 81 and 83 at different rates of speed, the loops 149 and 155 are permanently maintained in the strip material. In the power operation of the machine, the shearing knives 85 and 87 are then operated by the cam 94 and the link 92, while the drive of the rollers 83 and 81 is controlled through the Geneva transmission, illustrated in Fig. 10.

The ratio of speed at which the permanently driven rollers are actuated may be altered by removal of the gear 15 (Fig. 3) and replacement of the same by another suitable gear which, of course, can be effected upon adjustment of the bracket 16. Also the gear 71 which is secured to the bracket 73 may be exchanged for another suitable gear to modify the rate of speed at which the rollers 83 and 81 are driven. Depending upon the speed of the last named roller, the units which are cut by the shears 85 and 87 from the strip of material fed through the machine may be made larger or smaller, but it is obvious that in the passage of the material through the machine at least three of the edges of each of these units (not shown) will be trimmed. It is also obvious that through the continuous passage of the material through the several sets of rollers, the material, itself, is straightened out, thereby avoiding all buckling and delivering the material in perfectly flat condition to the shears 85 and 87, the severed units being permitted to drop or being delivered to a table or the like from which they may be picked up manually or automatically in some suitable way (not shown) for transmission to a punching press or some other suitable machine in which the final shape is to be given to the same.

Owing to the drive connection between the shaft 27' at the front end of the machine with the shaft 96, the waste edge strip cut from the material by the cutter 55 will be reeled up on the shaft 96, and after it has attained a suitable diameter this strip may be removed by simply swinging the cap 98 about the pivot of the bracket 97 and leaving the bearing in open position until another shaft 96 can be installed therein.

When the supply spool S has been exhausted, another spool may be placed into the bracket 108 and the front edge of this succeeding spool may be placed upon the rear edge of the sheet which still projects from the rollers 34' and 29'. These two superposed edges may then be placed into the crimping device formed by the bars 112 and 109 and through swinging movement of the handle 116 the plates may unite those edges so that the passage of the second strip of sheet material through all of the rollers and other devices of the machine can be accomplished without necessitating a manual threading of this second sheet material through the machine.

I claim:

1. In a machine of the character described, the combination of a set of straightening rollers, a set of feeding rollers, means for continuously driving said feeding and straightening rollers, a main shaft, gearing interposed between said main shaft and said feeding and straightening rollers, means for varying the ratio of said last named gearing with respect to the main shaft, a severing mechanism, a set of rollers for intermittently feeding material to said severing mechanism, and means for intermittently actuating said severing mechanism.

2. In a machine of the character described, the combination of a set of straightening rollers, means for feeding sheet material to said straightening rollers, continuously driven means for trimming an edge of sheet material, a mechanism for sub-dividing the material into units of predetermined length, and a common means for driving said rollers and mechanisms.

3. In a machine of the character described, the combination of straightening rollers, a mechanism interposed between said straightening rollers, a feeding means for trimming the longitudinal edge of sheet material passing through said straightening rollers, a shearing mechanism disposed at an angle to the direction of travel of the sheet material, and means for intermittently actuating said last named mechanism.

4. In a machine of the character described, the combination of straightening rollers, feeding rollers for feeding sheet material to said straightening rollers, rotary cutters interposed between said straightening rollers and feeding rollers, a shearing mechanism at a distance from said straightening rollers, means for continuously actuating said feeding rollers, rotary cutters and straightening rollers, and means for intermittently actuating said shearing mechanism.

5. In a machine of the character described, the combination of straightening rollers, rollers for feeding sheet material to said straightening rollers, a set of cooperating cutters adjustably disposed between said feeding rollers and said straightening rollers, means for permanently actuating said rollers and cutters from a common source, a shearing mechanism, and means for intermittently actuating said shearing mechanism.

6. In a machine of the character described, the combination of a set of straightening rollers, a set of rollers for feeding sheet material to said straightening rollers, a set of rotary cutters disposed between said feeding rollers and straightening rollers, said cutters being adjustable transversely to the direction in which the sheet material is advanced from the feeding rollers, to said straightening rollers, a cutting mechanism adapted to effect cuts transversely to the traveling direction of the sheet material in said mechanism, means for intermittently actuating said cutting mechanism, and means for intermittently feeding sheet material after the passage through said straightening rollers to said cutting mechanism.

7. In a machine of the character described, the combination of straightening rollers, feeding rollers, rotary cutters, means for permanently actuating said feeding rollers, cutters, and straightening rollers, a shearing mechanism, a set of rollers for intermittently feeding material to said shearing mechanism, and means in each of said sets of rollers and set of cutters for yieldingly adjusting one member with respect to the companion member and independently of the adjustments made in the other sets of these rollers and cutters.

8. In a machine of the character described, the combination of a main shaft, a plurality of sets of straightening rollers serially disposed in the machine, a set of feeding rollers, rotary cutters between said feeding rollers and said straightening rollers, gears mounted on said shaft, a second shaft transversely disposed with respect to said straightening rollers, gearing cutters, and feeding rollers, means on said second shaft for driving all of said rollers and cutters, and gearing interposed between said gears on the main shaft and said second shaft for transmitting rotation from said first shaft to said second shaft.

9. In a machine of the character described, a main shaft, a cam continuously rotated thereby, a countershaft, a cam plate on said countershaft cooperating with said permanently rotating cam for intermittently locking said countershaft against rotation, a pair of feeding rollers, gearing exchangeably disposed between said countershaft and said feeding rollers, a reciprocating shearing mechanism, a second cam on the main shaft, and means under control of said second cam for intermittently actuating said shearing mechanism in a predetermined direction.

10. In a machine of the character described, the combination of cutting and trimming mechanism, a set of straightening rollers, power-controlled means for continuously rotating said straightening rollers, and means independent of said power means for rotating said straightening rollers in the same direction as under control of the power means and independently of the power means.

11. In a machine of the character described, the combination of cutting and trimming mechanism, a set of cooperating rotary members, a power mechanism for rotating one of said members, means for transmitting the rotation to the companion member, and means on said companion member for rotating independently of said power mechanism the first named member in a predetermined direction.

12. In a machine of the character described, the combination of cutting and trimming mechanism, a set of rollers, power mechanism for driving one of said rollers, gearing interposed between the two rollers, a yielding clutch in connection with the power-driven roller, and means associated with the other roller for rotating said power-driven roller independently of the power drive through the gearing interposed between the two rollers.

13. In a machine of the character described, the combination of cutting and trimming mechanism, a set of rollers in superposed arrangement, power means for driving the lower roller, gearing interposed between the lower and the upper roller, a clutch connecting said power means with the lower roller, and means associated with the upper roller for driving said upper and lower roller and for automatically disconnecting the clutch between said power mechanism and the lower roller.

14. In a machine of the character described, the combination of cutting and trimming mechanism, a set of rollers in superposed arrangement, power actuated means for driving the lower roller, transmission gearing between the lower and upper roller, and hand-controlled means associated with the upper roller for driving the lower roller independently of said power means, said last named hand-controlled transmission being in the line of power transmission but being inversely directed with respect thereto.

15. In a machine of the character described, the combination of cutting and trimming mechanism, a set of rollers in superposed arrangement, a shaft for the lower roller, power driving means for said shaft, a clutch element rigidly connected with said shaft and adapted to cause rotation of the roller mounted on said shaft in a predetermined direction, gearing associated with the lower roller, gearing associated with the upper roller in engagement with the first named gearing, a shaft for the upper roller, and a hand-controlled element on said shaft for rotating the lower roller through said gearing without rotating the shaft on which said lower roller is mounted.

16. In a machine of the character described, the combination of cutting and trimming mechanism, a roller, a power-driven shaft therefor, a clutch element secured to said shaft, a spring controlled element mounted in said clutch element engaging said roller, said spring-controlled element being adapted to cause rotation of said roller upon rotation of the said shaft in a predetermined direction and to permit rotation of said roller in the same direction without rotating said shaft.

17. In a machine of the character described, in combination with straightening rollers, feeding rollers, a rotary cutter interposed between said feeding rollers and straightening rollers, a power-driven shaft for simultaneously rotating said straightening rollers and feeding rollers, a gearing interposed between said feeding rollers, and rotary cutters for imparting rotation to said cutters coincidently with the rotation of said feeding rollers.

18. In a machine of the character described, the combination of a set of straightening rollers, feeding rollers for said straightening rollers, rotary cutters, interposed between said feeding rollers and straightening rollers and adapted to trim the longitudinal edge of sheet material in the passage from said feeding rollers to said straightening rollers, and means for winding the trimmed edge in spool form in the machine.

19. In a machine of the character described, the combination of straightening rollers, feeding rollers, rotary cutters interposed between said straightening rollers and feeding rollers and adapted to trim the longitudinal edge of sheet material in the passage from said feeding rollers to said straightening rollers, power-driven means for rotating said feeding rollers and straightening rollers, and power-driven means for winding the edge of the sheet material in spool form in the machine.

20. In a machine of the character described, the combination of a plurality of straightening rollers, feeding rollers, rotary cutters interposed between said feeding rollers and straightening rollers, power-driven means for actuating said feeding rollers and straightening rollers, said rotary cutters being adapted to trim the edge of sheet material in the passage from said feeding rollers to said straightening rollers, mechanism for winding the severed edge portion in spool form, and means under the control of the feeding rollers for driving said winding mechanism.

21. In a machine of the character described, the combination of feeding rollers, power-driven means for actuating the feeding rollers, rotary cutters driven by said feeding rollers and adapted to trim the edge of sheet material passed through the feeding rollers, mechanism for winding the severed edge portion in spool form, and a drive connection between said feeding rollers and said winding mechanism.

22. In a machine of the character described, the combination of feeding rollers for sheet material, power-actuated means for continuously rotating said feeding rollers, rotary cutters driven by said feeding rollers and adapted to trim the edge of sheet material passed through the feeding rollers, a winding mechanism for the severed edge portion, a power drive from the feeding rollers to said winding mechanism, said winding mechanism including a shaft and a bearing for said shaft, said bearing having an upper portion and a lower portion, and spring-controlled means for maintaining the upper portion locked in operative position with respect to the lower portion.

23. In a machine of the character described, the combination of feeding rollers extending transversely of the machine, a crimping mechanism extending transversely of the machine, said crimping mechanism including a stationary edge plate and movable edge plate, and means for imparting movement to said last named edge plate with respect to the other edge plate.

24. In a machine of the character described, the combination of a set of feeding rollers extending transversely of the machine, a support for sheet material extending transversely of the machine, and a crimping device for connecting transverse edge portions of two pieces of sheet material, said crimping device including a stationary edge bar, a movable edge bar having the axis of pivotal movement coincident with the edge of the stationary bar, and means for imparting a pivotal movement to said second named edge bar.

In testimony whereof I affix my signature in the presence of two witnesses at 36 West Randolph Street, Chicago, Illinois.

CLARENCE F. WOODWORTH.

Witnesses:
DANIEL F. BRENNAN,
DOROTHY WISE.